(12) United States Patent
Kono

(10) Patent No.: US 9,501,189 B2
(45) Date of Patent: Nov. 22, 2016

(54) ELECTRONIC DEVICE AND METHOD FOR CONTROLLING ELECTRONIC DEVICE

(71) Applicant: KYOCERA CORPORATION, Kyoto-shi, Kyoto (JP)

(72) Inventor: Kenji Kono, Yokohama (JP)

(73) Assignee: KYOCERA CORPORATION, Kyoto (JP)

(*) Notice: Subject to any disclaimer, the term of this patent is extended or adjusted under 35 U.S.C. 154(b) by 45 days.

(21) Appl. No.: 14/354,147

(22) PCT Filed: Oct. 26, 2012

(86) PCT No.: PCT/JP2012/006887
§ 371 (c)(1),
(2) Date: Apr. 25, 2014

(87) PCT Pub. No.: WO2013/061607
PCT Pub. Date: May 2, 2013

(65) Prior Publication Data
US 2014/0267164 A1    Sep. 18, 2014

(30) Foreign Application Priority Data
Oct. 27, 2011  (JP) .................................. 2011-236189

(51) Int. Cl.
| G06F 1/00 | (2006.01) |
| G06F 3/044 | (2006.01) |
| G06F 3/0488 | (2013.01) |
| G06F 3/041 | (2006.01) |

(52) U.S. Cl.
CPC ............. *G06F 3/044* (2013.01); *G06F 3/0418* (2013.01); *G06F 3/0488* (2013.01); *G06F 2203/04105* (2013.01); *H04M 2250/22* (2013.01)

(58) Field of Classification Search
CPC .................................. G06F 1/00; G06F 3/041
See application file for complete search history.

(56) References Cited

U.S. PATENT DOCUMENTS

2014/0049483 A1* 2/2014 Kim ...................... G06F 3/0488
345/173

FOREIGN PATENT DOCUMENTS

| JP | 863289 A | 3/1996 |
| JP | 2004245682 A * | 9/2004 |

OTHER PUBLICATIONS

International Search Report mailed Jan. 29, 2013, corresponds to PCT/JP2012/006887.

* cited by examiner

*Primary Examiner* — Michael Faragalla
(74) *Attorney, Agent, or Firm* — Hauptman Ham, LLP

(57) ABSTRACT

An electronic device includes a control unit (60) that performs processing associated with an object displayed on a display unit (20) in accordance with a contact position of a contacting body in an input acceptance region, of a contact detection unit (10), corresponding to the object and in accordance with data based on pressure detected by a pressure detection unit (30). When the contact position of the contacting body detected by the contact detection unit (10) changes from being inside the input acceptance region to outside the input acceptance region along with an increase in the data based on pressure detected by the pressure detection unit (30), the control unit (60) performs control to consider the contact position to be inside the input acceptance region, thereby preventing operations not intended by the operator when a contact position shifts due to the start of pressure.

4 Claims, 4 Drawing Sheets

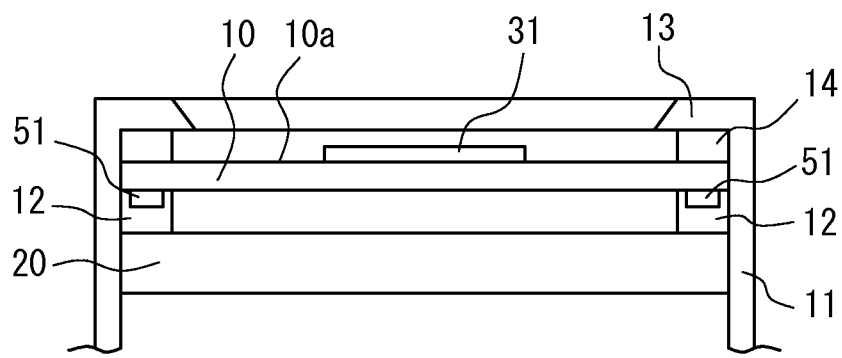
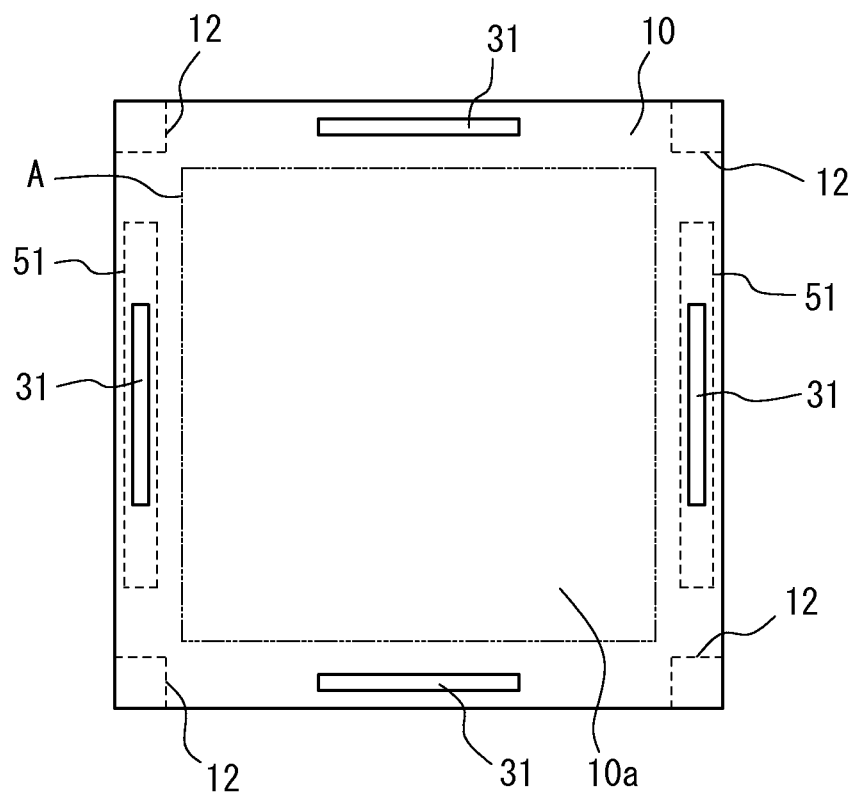

ELECTRONIC DEVICE AND METHOD FOR CONTROLLING ELECTRONIC DEVICE

CROSS-REFERENCE TO RELATED APPLICATION

This application is a National Phase of International Application Number PCT/JP2012/006887 filed Oct. 26, 2012 and claims priority to and the benefit of Japanese Patent Application No. 2011-236189 filed Oct. 27, 2011, the entire contents of which are incorporated herein by reference.

TECHNICAL FIELD

The present invention relates to an electronic device provided with a contact detection unit and to a method for controlling an electronic device.

BACKGROUND

In recent years, among mobile terminals such as cellular phones, electronic devices are increasingly provided with a contact detection unit, such as a touch sensor or touch switch, as a member for detecting an operation by the operator. Electronic devices provided with a contact detection unit are in wide use apart from mobile terminals as well, in devices such as calculators or ticket vending machines, household appliances such as microwave ovens, televisions, or lighting appliances, industrial devices (factory automation equipment), and the like.

A variety of types of such contact detection units are known, including a resistive film type and a capacitive type. All of these types of contact detection units detect contact by the operator's finger, a stylus pen, or the like. Typically, an electronic device provided with a contact detection unit displays images (referred to below as "objects") such as operation keys or buttons (referred to below simply as "operation key or the like") on the display screen of a display unit provided on the rear face of the contact detection unit. When the operator presses an object displayed on the display screen, the contact detection unit is configured to detect contact at the position of the press.

A known electronic device resolves erroneous input operations, such as misalignment or multiple input that are characteristic for each operator, by adjusting the allowable input area individually for each operator (for example, see Patent Literature 1).

Furthermore, to prevent processing by the electronic device from being performed when the contact detection unit is simply brushed lightly with a finger, an electronic device has been proposed to accept input when a pressure load satisfying a predetermined input acceptance standard is applied to a contact detection unit. Hereinafter, such an electronic device is referred to as an "electronic device having a pressure load detection function".

CITATION LIST

Patent Literature 1: JP H8-063289 A

SUMMARY

The present invention provides an electronic device and a method for controlling an electronic device that can prevent an operation not intended by the operator when the contact position shifts due to the operator starting to apply pressure.

In order to achieve the above matter, an electronic device according to the present invention includes a display unit configured to display an object; a contact detection unit configured to detect contact by a contacting body; a pressure detection unit configured to detect pressure due to contact on the contact detection unit; and a control unit configured to execute processing associated with the object displayed on the display unit in accordance with a contact position of the contacting body in an input acceptance region, of the contact detection unit, corresponding to the object and in accordance with data based on pressure detected by the pressure detection unit, such that when the contact position of the contacting body detected by the contact detection unit changes from being inside the input acceptance region to outside the input acceptance region along with an increase in the data based on pressure detected by the pressure detection unit, the control unit performs control to consider the contact position to be inside the input acceptance region.

Furthermore, a method according to the present invention is for controlling an electronic device that includes a display unit configured to display an object; a contact detection unit configured to detect contact by a contacting body; and a pressure detection unit configured to detect pressure due to contact on the contact detection unit, the method including the steps of executing processing associated with the object displayed on the display unit in accordance with a contact position of the contacting body in an input acceptance region, of the contact detection unit, corresponding to the object and in accordance with data based on pressure detected by the pressure detection unit; and when the contact position of the contacting body detected by the contact detection unit changes from being inside the input acceptance region to outside the input acceptance region along with an increase in the data based on pressure detected by the pressure detection unit, performing control to consider the contact position to be inside the input acceptance region.

According to the present invention, it is possible to provide an electronic device and a method for controlling an electronic device that can prevent an operation not intended by the operator when a contact position shifts due to the start of pressure.

BRIEF DESCRIPTION OF DRAWINGS

The present invention will be further described below with reference to the accompanying drawings, wherein:

FIGS. 2A and 2B illustrate an exemplary housing structure of the electronic device according to an embodiment of the present invention;

DESCRIPTION OF EMBODIMENTS

When an operator presses an object, such as an operation key or the like, displayed on the display unit, an electronic device may determine that an object has been pressed at the instant the operator contacts the object. Therefore, if the contact position first contacted by the operator is inside the region of the object, the processing associated with the object starts. On the other hand, with an electronic device having a pressure load detection function, an object is not determined to have been pressed upon the operator simply contacting the contact detection unit, but rather is determined to have been pressed when a pressure force is subsequently applied. In this case, if the operator applies strong pressure so as to press down on the pressed location, the contact position of the finger with the contact detection unit moves from the fingertip to the finger pad, thus causing a shift in the contact position.

Figure 4A:
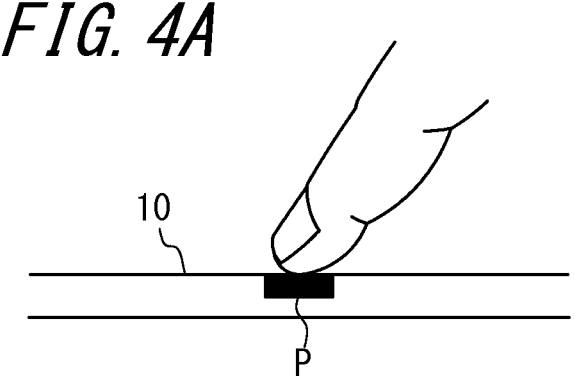
FIGS. 4A-4C illustrate a shift in contact position in a known electronic device.
Figure 4B:
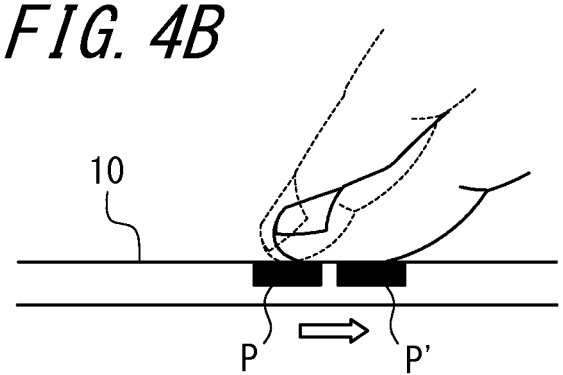
Figure 4C:
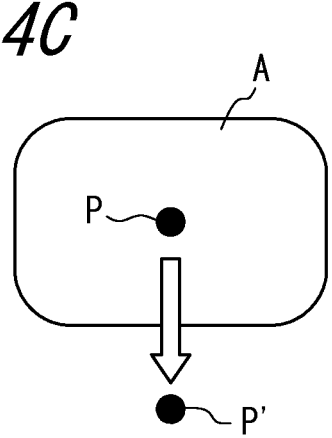

FIGS. 4A-4C illustrate a shift in contact position in an electronic device. Typically, as illustrated in FIG. 4A, an electronic device determines a contact position P at the instant the operator contacts a contact detection unit 10 with a finger and determines that the object corresponding to the contact position P has been pressed. In the case of an electronic device having a pressure load detection function, however, the only determination for the contact position P that is first contacted is whether the contact position P corresponds to the position of an object. Subsequently, it is determined that the object has been pressed if a pressure force is applied so as actually to press the object down. When a person forcibly presses a flat surface with a finger, pressure is applied to the finger pad, so that the shape of the finger changes from the shape shown by the dashed line to that shown by the solid line in FIG. 4B. As a result, the contact position moves from the fingertip to the finger pad, from P to P'. The contact position is, for example, the position of the median point of the pressed area for a resistive film type and is the central position of the area contacted in the contact detection unit for a capacitive type.

As illustrated in FIG. 4C, even if the contact position P is inside an input acceptance region A at first, the contact position may shift upon the application of a pressure load, and the shifted contact position P' may end up outside of the acceptance region A.

As illustrated in FIG. 4C, when the operator applies a pressure force to the contact detection unit 10 in order to press the input acceptance region A for an object in the contact detection unit (referred to below simply as "input acceptance region"), and the shifted contact position P' is outside of the input acceptance region A, the electronic device determines that pressing of the object has been interrupted. Moreover, if another object is located nearby the object being pressed, it may be determined that the nearby object has been pressed due to the shift in contact position.

With the technique disclosed in Patent Literature 1 (JP H8-063289 A), the size of the display image or the allowable input area is adjusted at the point at which the operator presses the object and therefore this technique may not adjust for the shift in contact position caused by the start of application of a pressure load. Furthermore, in the case of an electronic device having a pressure load detection function, a shift in position occurs regardless of finger size. The technique disclosed in Patent Literature 1, however, may not perform adjustment to increase the display image or the allowable input area for an operator with a slender finger (small contact area).

In this way, when the contact position shifts due to the operator starting to apply pressure, a known electronic device may not prevent operations not intended by the operator, such as interruption of pressing of an object, or pressing of a neighboring object.

The present invention has been conceived in light of these circumstances.

The following describes an embodiment of the present invention in detail with reference to the drawings.

Figure 1:
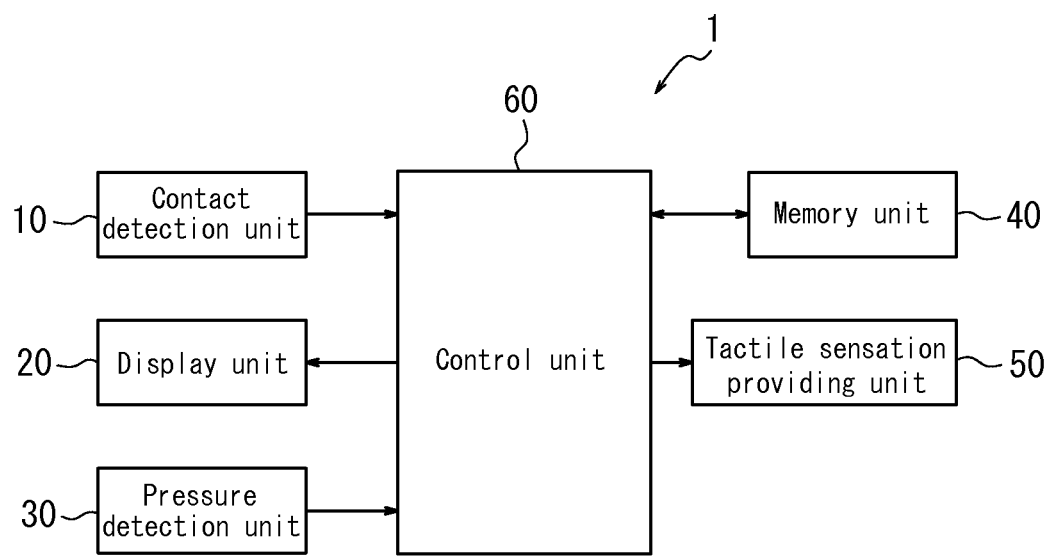
FIG. 1 is a block diagram schematically illustrating the configuration of an electronic device according to an embodiment of the present invention.

FIG. 1 is a block diagram schematically illustrating the configuration of an electronic device according to an embodiment of the present invention. As illustrated in FIG. 1, the electronic device 1 is provided with a contact detection unit 10, a display unit 20, a pressure detection unit 30, a memory unit 40, a tactile sensation providing unit 50, and a control unit 60.

The display unit 20 displays images of objects, such as a push button switch (push-type button switch). A push button switch is a button, key, or the like with which the operator performs an input operation. The display unit 20 is, for example, configured using a liquid crystal display panel (LCD), an organic EL display panel, or the like.

The contact detection unit 10 is normally provided on the front face of the display unit 20 and detects, on a corresponding input face 10a (see FIGS. 2A and 2B) of the contact detection unit 10, contact or release of contact by a contacting body (pressing object), such as the operator's finger, with an object displayed on the display unit 20. The contact detection unit 10 detects the contact position on the input face 10a and notifies the control unit 60 of the detected contact position. The contact detection unit 10 is of a well-known type, such as a resistive film type, capacitive type, or the like. Note that for the contact detection unit 10 to detect contact by the contacting body, it is not essential for the contacting body to physically contact the contact detection unit 10. For example, if the contact detection unit 10 is an optical type, the contact detection unit 10 detects the position at which an infrared ray on the contact detection unit 10 is blocked by the contacting body, and therefore the contacting body need not contact the contact detection unit 10.

The pressure detection unit 30 detects data based on pressure due to contact on the input face 10a of the contact detection unit 10 and is, for example, configured using a strain gauge sensor, a piezoelectric element, or the like. The pressure detection unit 30 notifies (provides output to) the control unit 60 of the detected data (such as voltage) based on pressure on the input face 10a.

The memory unit 40 can be composed of memory according to a known technique, stores a variety of input information, programs for causing the electronic device 1 to operate, and the like, and also functions as work memory. In greater detail, in the present embodiment, the memory unit 40 stores an input acceptance threshold, which is a threshold for accepting the data based on pressure detected by the pressure detection unit 30 as input, an input acceptance release threshold, which is a threshold for releasing input acceptance and is equal to or less than the input acceptance threshold, and an input acceptance region corresponding to each object. It should be noted that when the pressure detection unit 30 outputs voltage to the control unit 60, each threshold is a voltage threshold.

When the contact position acquired from the contact detection unit 10 is inside the input acceptance region, of the contact detection unit 10, corresponding to the object displayed on the display unit 20, and the data (voltage) based on pressure detected by the pressure detection unit 30 satisfies a predetermined standard, i.e. when the data based on pressure exceeds the input acceptance threshold stored in the memory unit 40, the control unit 60 executes predetermined processing associated with the object. Along with executing processing associated with the object, the control unit 60 also instructs the tactile sensation providing unit 50 to perform a tactile sensation providing operation.

When the contact position of the contacting body detected by the contact detection unit 10 changes from being inside the input acceptance region to outside the input acceptance region along with an increase in the data based on pressure detected by the pressure detection unit 30, the control unit 60 performs control to consider the contact position to be inside the input acceptance region.

The tactile sensation providing unit 50 is, for example, configured using a piezoelectric vibrator or the like and provides a predetermined tactile sensation to the contacting body in contact with the input face 10a by generating vibration in a predetermined vibration pattern or the like. With the tactile sensation providing unit 50, it is possible to notify the operator as to whether the pressure satisfies the input acceptance standard.

FIGS. 2A and 2B illustrate an exemplary housing structure of the electronic device 1 illustrated in FIG. 1. FIG. 2A is a cross-sectional diagram of the main portions, and FIG. 2B is a plan view of the main portions. The display unit 20 is contained in a housing 11. The contact detection unit 10 is held on the display unit 20 via insulators 12 made of elastic members. Note that the display unit 20 and the contact detection unit 10 in the electronic device 1 according to the present embodiment are shown as rectangles in plain view. In the present embodiment, the contact detection unit 10 is held on the display unit 20 via the insulators 12 arranged at four corners outside a display area A of the display unit 20 illustrated by a phantom line in FIG. 2B.

The housing 11 is provided with an upper cover 13 covering a surface area of the contact detection unit 10 outside the display area of the display unit 20, and an insulator 14 made from an elastic member is provided between the upper cover 13 and the contact detection unit 10.

The contact detection unit 10 illustrated in FIG. 2 has a surface member, configured for example using a transparent film or glass, and has a rear face member configured using glass or acryl. The surface member includes the input face 10a. The contact detection unit 10 is structured so that when the input face 10a is pressed, the pressed part bends (strains) slightly in response to the pressure load, or the entire structure bends slightly.

A strain gauge sensor 31 for detecting pressure due to contact on the contact detection unit 10 is provided, by attachment or the like, on the surface of the contact detection unit 10 near each side thereof at a position covered by the upper cover 13. Furthermore, piezoelectric vibrators 51 for vibrating the contact detection unit 10 are provided, by attachment or the like, on the rear face of the contact detection unit 10 near two opposing sides thereof. In other words, in the electronic device 1 illustrated in FIGS. 2A and 2B, the pressure detection unit 30 illustrated in FIG. 1 is configured using four strain gauge sensors 31, and the tactile sensation providing unit 50 is configured using two piezoelectric vibrators 51. The tactile sensation providing unit 50 vibrates the contact detection unit 10 in order to cause the input face 10a to vibrate. Note that in FIG. 2B, the housing 11, upper cover 13, and insulator 14 illustrated in FIG. 2A are omitted.

Figure 3:
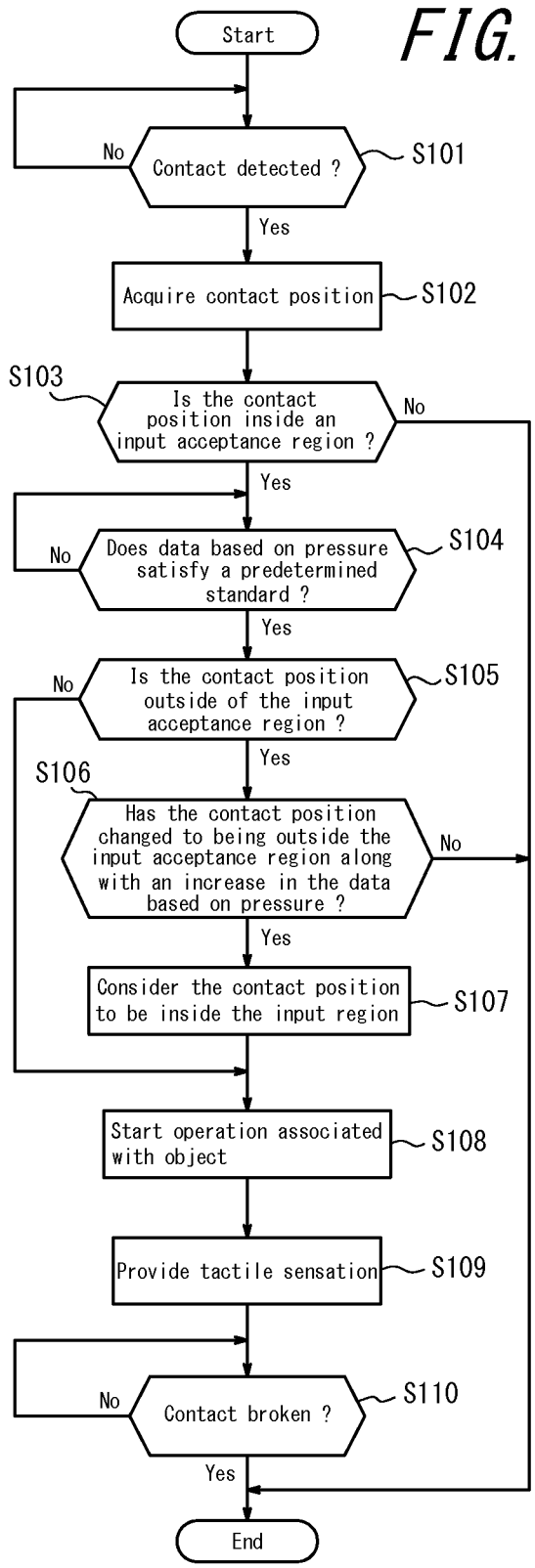
FIG. 3 is a flowchart illustrating operations by an electronic device according to an embodiment of the present invention.

Next, operations of the electronic device 1 with the above configuration according to the present embodiment are described. FIG. 3 is a flowchart illustrating operations by the electronic device 1 according to the present embodiment.

First, when operations of the electronic device 1 start, the control unit 60 monitors for contact on the contact detection unit 10 (step S101). When contact on the contact detection unit 10 by a contacting body such as the operator's finger is detected in step S101, the control unit 60 acquires the contact position from the contact detection unit 10 (step S102).

The control unit 60 determines whether the contact position acquired in step S102 is located inside a region of the contact detection unit 10 corresponding to the region at which the object of a key or the like is displayed (i.e. inside the input acceptance region; step S103). If the contact position is not located inside the input acceptance region of the object, processing terminates. Conversely, if the position is located inside the input acceptance region of the object, the control unit 60 periodically acquires data based on pressure detected by the pressure detection unit 30 and waits until the acquired data reaches the predetermined input acceptance standard, i.e. until the acquired data based on pressure exceeds the input acceptance threshold stored in the memory unit 40 (step S104). The input acceptance threshold is a threshold corresponding to the minimum necessary pressure load when the operator presses down on the contact detection unit 10.

When the data based on pressure detected by the pressure detection unit 30 satisfies the predetermined input acceptance standard, the control unit 60 then determines whether the contact position is located inside the input acceptance region for an object (step S105). When the contact position is not located inside the input acceptance region for an object, i.e. when the contact position has changed from being inside the input acceptance region for an object to outside the input acceptance region, the control unit 60 then determines whether the contact position of the contacting body detected by the contact detection unit 10 has changed from being inside the input acceptance region to outside the input acceptance region along with an increase in the data based on pressure detected by the pressure detection unit 30 (step S106). When the contact position of the contacting body detected by the contact detection unit 10 has changed from being inside the input acceptance region to outside the input acceptance region along with an increase in the data based on pressure detected by the pressure detection unit 30, the control unit 60 considers the contact position to be inside the input acceptance region (step S107) and starts processing associated with the object, treating the object corresponding to the input acceptance region as having been pressed (step S108). Note that also in the case when, in step S105, the contact position is located inside the input acceptance region for an object, the control unit 60 transitions to step S108 and starts processing associated with the object, treating the object corresponding to the input acceptance region as having been pressed. In step S106, when the contact position of the contacting body detected by the contact detection unit 10 does not change from being inside the input acceptance region to outside the input acceptance region along with an increase in the data based on pressure detected by the pressure detection unit 30, the control unit 60 terminates processing.

After step S108, the control unit 60 also instructs the tactile sensation providing unit 50 to perform a tactile sensation providing operation (step S109). The control unit 60 then waits until the finger breaks contact (i.e. the finger becomes separated from the contact detection unit 10) (step S110). For example, when the data based on pressure detected by the pressure detection unit 30 becomes less than the input acceptance release threshold stored in the memory unit 40, the control unit 60 determines that the finger has broken contact. Upon determining that the finger has broken contact, the control unit 60 terminates processing.

In this way, according to the electronic device 1 of the present invention, when the contact position of the contacting body detected by the contact detection unit 10 changes from being inside the input acceptance region to outside the input acceptance region along with an increase in the data based on pressure detected by the pressure detection unit 30, the control unit 60 performs control to consider the contact position to be inside the input acceptance region. Hence, when the contact position shifts due to the start of pressure, it is possible to prevent an operation not intended by the operator, such as interruption of pressing of an object or pressing of a neighboring object.

Note that the present invention is not limited to the above embodiment, and a variety of modifications and changes are possible. For example, in the above embodiment, the present invention has been described by way of electronic devices, yet the present invention may be implemented by a method for controlling an electronic device substantially equivalent to these electronic devices, by a program, or by a recording medium storing the program. The scope of the present invention should be understood as including these aspects. Furthermore, in the above-described embodiment, the contact detection unit 10 is used to detect contact on the input face 10a, but alternatively a load sensor (load detection unit) may be used to determine that contact has been made when data based on a predetermined pressure load has satisfied a standard. Like the pressure detection unit 30 in the above-described embodiment, such a load detection unit can be configured using any number of strain gauge sensors 31 or the like.

Note that in the above embodiment, the contacting body (pressing object) has been described as a finger, but the contacting body may also be a stylus pen.

Furthermore, in the above embodiment, the pressure detection unit 30 can be configured in accordance with the contact detection type. For example, in the case of a resistive film type, a configuration without using the strain gauge sensor 31 may be adopted if pressure can be detected from a change in an output signal based on a change in resistance due to contact area. Alternatively, in the case of a capacitive type, a configuration without using the strain gauge sensor 31 may also be adopted if pressure can be detected from a change in an output signal based on a change in capacitance.

The tactile sensation providing unit 50 can be configured to vibrate the input face 10a of the contact detection unit 10 indirectly by causing the electronic device 1 to vibrate based on a vibration motor (eccentric motor). Furthermore, when the pressure detection unit 30 and the tactile sensation providing unit 50 are both configured using a piezoelectric element, the pressure detection unit 30 and the tactile sensation providing unit 50 can be configured to share the same piezoelectric element. The reason is that a piezoelectric element generates voltage when pressure is applied and deforms upon application of voltage.

The above embodiment has been described assuming a configuration in which the contact detection unit 10 is layered on the upper surface of the display unit 20, yet such a configuration is not required. A configuration in which the contact detection unit 10 and the display unit 20 are separated may be adopted.

Furthermore, in the above-described embodiment, the control unit 60 accepts input when data based on pressure satisfying the input acceptance standard is detected by the pressure detection unit 30. "Satisfying the input acceptance standard" may refer to data based on pressure detected by the pressure detection unit 30 reaching a predetermined value, to data based on pressure detected by the pressure detection unit 30 exceeding a predetermined value for accepting input, or to detection by the pressure detection unit 30 of data having a predetermined value for accepting input. Furthermore, in the explanation of the above embodiment, the meaning of expressions such as "exceeding" a threshold, or being "equal to or less than" a threshold, is not necessarily precise. "Exceeding" a threshold may include the case of being equal to or greater than the threshold, and being "equal to or less than" a threshold may include the case of just being less than the threshold.

In the above-described embodiment, the tactile sensation providing unit 50 provides a tactile sensation to the contacting body in contact with the input face 10a by generating a vibration in the input face 10a so as to provide a tactile sensation to the contacting body in contact with the input face 10a, but the present invention is not limited to this approach. A tactile sensation may be provided to the contacting body in contact with the input face 10a without using mechanical vibration, but rather by electrostatic force, for example by controlling the charge of a film attached to the contact detection unit 10.

Furthermore, the contact detection unit 10 and the display unit 20 in the above-described embodiment of the present invention may be configured as an integrated device, for example by providing a common substrate with the functions of both the contact detection unit 10 and the display unit 20. An example of such a device integrating the functions of both the contact detection unit 10 and the display unit 20 is a liquid crystal panel having a matrix of pixel electrodes, with a plurality of photoelectric conversion elements, such as photodiodes, regularly mixed therein. This device is contacted by a pen for touch input at a desired position on the panel display, and while displaying images with the liquid crystal panel structure, the device can detect the contact position by light from a backlight for liquid crystal display being reflected by the tip of the pen and received by surrounding photoelectric conversion elements.

In the above-described embodiment of the present invention, the pressure detection unit has been described in detail, yet when the pressure detection unit is configured using a piezoelectric element, the configuration to "detect pressure due to contact on the contact detection unit" includes a configuration to "output (generate) voltage based on pressure due to contact on the contact detection unit". Furthermore, a "standard for data based on pressure" includes "a standard based on voltage, i.e. a voltage standard". Similarly, "data based on pressure detected by the pressure detection unit" includes "voltage output (generated) by a piezoelectric element". In this way, when using a piezoelectric element as the pressure detection unit and having a piezoelectric element output (generate) voltage based on pressure due to contact on the contact detection unit, then the control unit may determine whether to execute a predetermined process based on voltage output by the piezoelectric element, without calculating the pressure load on the contact detection unit from the voltage output by the piezoelectric element.

REFERENCE SIGNS LIST

1: Electronic device
10: Contact detection unit
10a: Input face
11: Housing
12: Insulator
13: Upper cover
14: Insulator 20: Display unit
30: Pressure detection unit
31: Strain gauge sensor
40: Memory unit
50: Tactile sensation providing unit
51: Piezoelectric vibrator
60: Control unit

The invention claimed is:

1. An electronic device, comprising:
a display unit configured to display an object;
a contact detection unit configured to detect a contact;
a pressure detection unit configured to detect a pressure of the contact; and
a controller configured to execute a process associated with the object displayed on the display unit in accordance with (i) a contact position of the contact and (ii) the pressure,
wherein
the controller is configured to
determine a predetermined pressure on the object, and
execute the process associated with the object even if the contact position slides during the determination.

2. A method of controlling an electronic device, the electronic device comprising:
a display unit configured to display an object;
a contact detection unit configured to detect a contact; and
a pressure detection unit configured to detect a pressure of the contact,
the method comprising:
executing a process associated with the object displayed on the display unit in accordance with (i) a contact position of the contact (ii) the pressure; and
determining a predetermined pressure on the object,
wherein the process associated with the object is executed even if the contact position slides during the determining.

3. The method according to claim 2, wherein said determining comprises determining whether the pressure detected by the pressure detection unit is at least the predetermined pressure when the contact position slides from a first position inside an input acceptance region on the display unit to a second position outside the input acceptance region.

4. The electronic device according to claim 1, wherein the controller is configured to further determine whether the pressure detected by the pressure detection unit is at least the predetermined pressure when the contact position slides from a first position inside an input acceptance region on the display unit to a second position outside the input acceptance region.

* * * * *